(12) United States Patent
Kim et al.

(10) Patent No.: US 7,522,981 B2
(45) Date of Patent: Apr. 21, 2009

(54) METHOD FOR CHARGING BATTERY OF A HYBRID VEHICLE AND A HYBRID VEHICLE USING THE SAME

(75) Inventors: Kyung Ha Kim, Gyunggi-Do (KR); Yeon Ho Kim, Gyunggi-Do (KR); Joo Woong Youn, Seoul (KR); Kyung Won Hwang, Gyunggi-Do (KR)

(73) Assignee: Hyundai Motor Company, Seoul (KR)

( * ) Notice: Subject to any disclaimer, the term of this patent is extended or adjusted under 35 U.S.C. 154(b) by 419 days.

(21) Appl. No.: 11/305,431

(22) Filed: Dec. 14, 2005

(65) Prior Publication Data

US 2007/0129862 A1    Jun. 7, 2007

(30) Foreign Application Priority Data

Dec. 1, 2005    (KR) .................... 10-2005-0116649

(51) Int. Cl.
*B60K 20/00*    (2006.01)
(52) U.S. Cl. ..................... 701/36; 701/22; 180/65.4
(58) Field of Classification Search ................. None
See application file for complete search history.

(56) References Cited

U.S. PATENT DOCUMENTS

| | | | |
|---|---|---|---|
| 6,110,066 A * | 8/2000 | Nedungadi et al. .......... 475/5 |
| 6,589,128 B2 * | 7/2003 | Bowen .................. 475/5 |
| 6,883,626 B2 * | 4/2005 | Aoki et al. ............... 180/65.2 |
| 7,216,729 B2 * | 5/2007 | Syed et al. .............. 180/65.2 |
| 7,231,994 B2 * | 6/2007 | Buglione et al. .......... 180/65.3 |

FOREIGN PATENT DOCUMENTS

| | | |
|---|---|---|
| DE | 600 16 687 T2 | 11/2005 |
| JP | 3-243141 | * 10/1991 |
| JP | 2002-152913 | 5/2002 |
| JP | 2003-235110 | 8/2003 |
| JP | 2004-343934 | 12/2004 |
| JP | 2005-001532 | 1/2005 |

* cited by examiner

*Primary Examiner*—Michael J. Zanelli
(74) *Attorney, Agent, or Firm*—Peter F. Corless; Edwards Angell Palmer & Dodge LLP

(57) ABSTRACT

The present invention relates to a method for charging battery of a hybrid vehicle at neutral shift range and a hybrid vehicle using the same which enable generating and charging battery at a neutral shift range by restricting a rotation of an output element of the automatic transmission. A preferred method for charging battery of a hybrid vehicle at a neutral shift range according to an exemplary embodiment of the present invention includes determining whether current shift range is neutral shift range; measuring a battery SOC(state of charge); operating an EHB (Electro Hydraulic Brake) when the measured battery SOC is lower than a predetermined lower limit battery SOC; operating an generator by operating an engine; measuring a battery SOC after operating the generator; releasing EHB when the battery SOC measured after operating the generator is higher than the predetermined lower limit battery SOC.

7 Claims, 4 Drawing Sheets

METHOD FOR CHARGING BATTERY OF A HYBRID VEHICLE AND A HYBRID VEHICLE USING THE SAME

CROSS-REFERENCE TO RELATED APPLICATION

This application claims priority to and the benefit of Korean Patent Application No. 10-2005-0116649 filed in the Korean Intellectual Property Office on Dec. 1, 2005, the entire contents of which are incorporated herein by reference.

BACKGROUND OF THE INVENTION (a) Field of the Invention

The present invention relates to a method for charging battery of a hybrid vehicle at neutral shift range and a hybrid vehicle using the same generating electric energy and charging battery at a neutral shift range by restricting a rotation of an output element of the automatic transmission.

(b) Description of the Related Art

Typical hybrid vehicle has an automatic transmission having a planetary gear set consisting of a sun gear, a pinion gear, a planet carrier, and a ring gear.

In the planetary gear set, the sun gear is connected with a generator, the planet carrier is connected with an engine, and the ring gear is connected with a drive motor.

In the typical hybrid vehicle having such a structure, the engine is stopped at a neutral (N) shift range.

However, when the battery SOC (state-of-charge) is lower than predetermined lower limit, the engine is operated so as to charge the battery with a warning that the battery should be charged.

Here, the planet carrier is rotated by the engine, the ring gear is fixed by the weight of the vehicle, and the sun gear is freely rotated without any load. That is, a driving torque of the engine does not operate the generator.

Therefore, in this case, an engine rpm does not increase even though the driver kicks the accelerator pedal at the neutral (N) shift range.

If the engine rpm increases when the driver kicks the accelerator pedal at the neutral (N) shift range, a rotational speed and a torque of the planet carrier increases, and vehicle becomes run due to such a structure that cannot prevent power delivery to the wheel for running vehicle.

That is, if the engine is operated at the neutral (N) shift range so as to generate an electric power by operating the generator, the driving torque of the engine is delivered to the wheel through the ring gear, and vehicle runs. Therefore, according to the conventional hybrid vehicle, generating is prohibited at the neutral (N) shift range Referring to a shift diagram of FIG. 1, the reason that generation is prohibited may be readily understood.

A left speed diagram of FIG. 1 shows rotational speeds of operational elements in the planetary gear set when an electric power is not generated, and a right speed diagram of FIG. 1 shows rotational speeds of operational elements in the planetary gear set when an electric power is generated.

Referring to the left speed diagram of FIG. 1, the ring gear acts as a fixed element, and sun gear has no load because the generation is not performed.

However, if generation is occurred in such a condition, the sun gear connected with the generator becomes under the load, and accordingly the ring gear becomes under the load, as shown in the right speed diagram of FIG. 1. Therefore, the vehicle starts to run.

Due to such a problem, the conventional hybrid vehicle cannot generates an electric power at the neutral (N) shift range. Therefore, when an air conditioner or various ramps are excessively used, main battery may be discharged. In addition, a torque of engine cannot be efficiently used at the neutral (N) shift range.

The information set forth in this Background of the Invention section is only for enhancement of understanding of the invention and should not be taken as an acknowledgement or any form of suggestion that this information forms the prior art that is already known to a person skilled in the art.

SUMMARY OF THE INVENTION

The present invention has been made in an effort to provide a method for charging battery of a hybrid vehicle at neutral shift range and a hybrid vehicle using the same having advantages of generating electric energy and to charge battery at a neutral shift range by restricting a rotation of an output element of the automatic transmission.

An exemplary method of the present invention includes determining whether current shift range is neutral shift range; measuring a battery SOC (state of charge); operating an EHB (Electro Hydraulic Brake) when the measured battery SOC is lower than a predetermined lower limit battery SOC; operating an generator by operating an engine; measuring a battery SOC after operating the generator; releasing EHB when the battery SOC measured after operating the generator is higher than the predetermined lower limit battery SOC. Preferably, the engine power may be reduced or stopped concurrently with releasing the EHB.

The operating an EHB (Electro Hydraulic Brake) when the measured battery SOC is lower than a predetermined lower limit battery SOC may include comparing the measured battery SOC with a predetermined lower limit battery SOC; outputting a dummy signal to the travel stroke sensor when the measure battery SOC is lower than the predetermined lower limit battery SOC; and operating the EHB on the basis of the dummy signal.

A driveshaft may be fixedly connected with a wheel, the EHB may restrict a rotation of the driveshaft by restricting a rotation of a wheel, and the driveshaft may be connected with a ring gear of a planetary gear set installed in an automatic transmission.

The predetermined lower limit battery SOC may be e.g. about 50% or less such as about 40%, or lower values.

An exemplary hybrid vehicle according to the present invention includes an engine; a generator; a driveshaft for rotating a wheel; a planetary gear set having a sun gear, a ring gear, and a planet carrier, and connected with the engine, the generator and the driveshaft; a HCU generating a dummy signal so as to operate an EHB (Electro Hydraulic Brake) when a battery shortage is detected; and the EHB restricting a rotation of a wheel on the basis of the dummy signal.

The sun gear may be connected with the generator, the planet carrier may be connected with the engine, the ring gear may be connected with the driveshaft, and a rotation of the driveshaft and ring gear coupled to the wheel may be restricted when the EHB restricts a rotation of the wheel.

It is understood that the term "vehicle" or "vehicular" or other similar terms as used herein is inclusive of motor vehicles in general such as passenger automobiles including sports utility vehicles (SUV), buses, trucks, various commercial vehicles, and the like. The present methods and systems will be particularly useful with a wide variety of hybrid motor vehicles including automobiles, trucks and the like.

Other aspects of the invention are discussed below.

DETAILED DESCRIPTION

As discussed above, in one aspect, a method for charging battery of a hybrid vehicle at a neutral shift range is provided comprising: determining whether current shift range is neutral shift range; measuring a battery state of charge; operating an electro hydraulic brake when the measured battery state of charge is lower than a predetermined lower limit battery state of charge; operating a generator; measuring a battery state of charge after operating the generator; releasing the electro hydraulic brake when the battery state of charge measured after operating the generator is higher than the predetermined lower limit battery state of charge. Preferably, the engine may be reduced or stopped concurrently with releasing of the electro hydraulic brake.

An exemplary embodiment of the present invention will hereinafter be described in detail with reference to the accompanying drawings.

Figure 1:
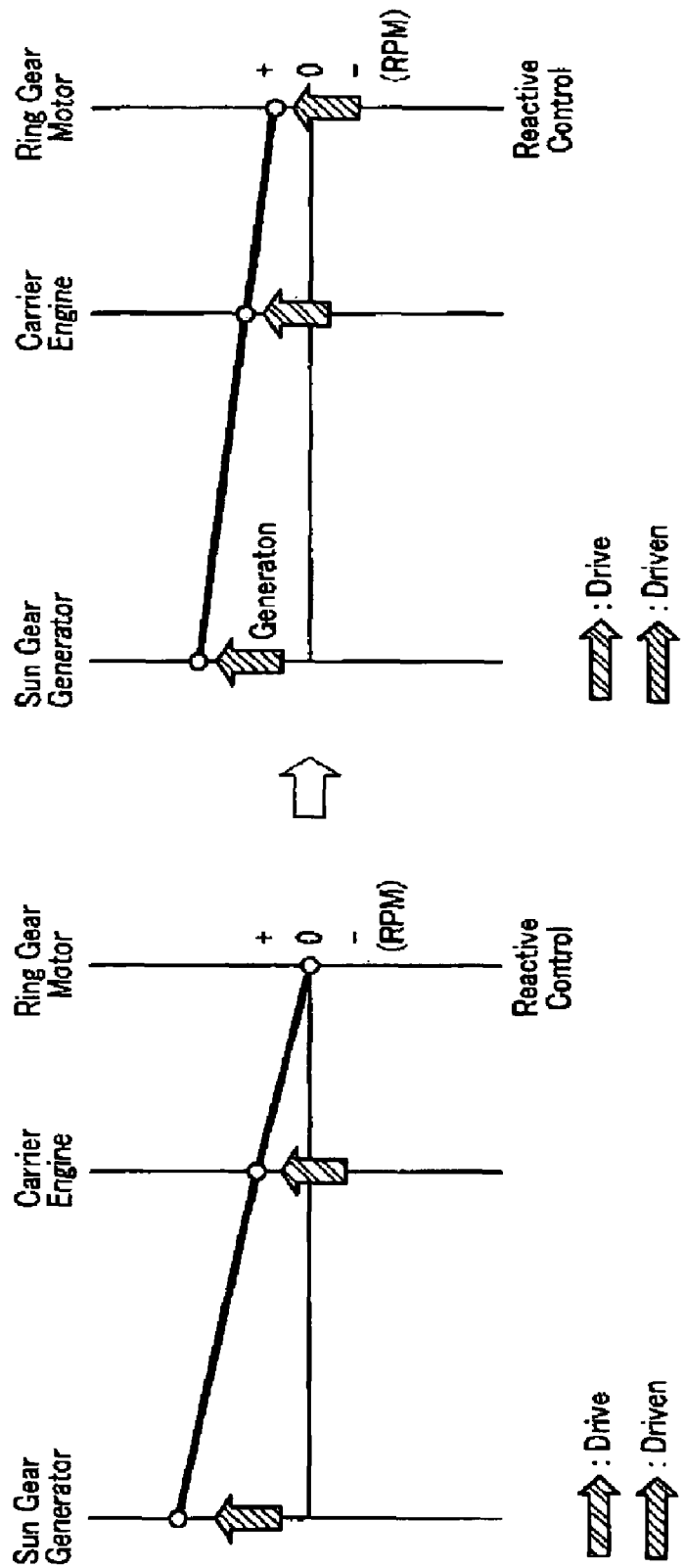
FIG. 1 is a shift diagram according to a conventional hybrid vehicle.
Figure 2:
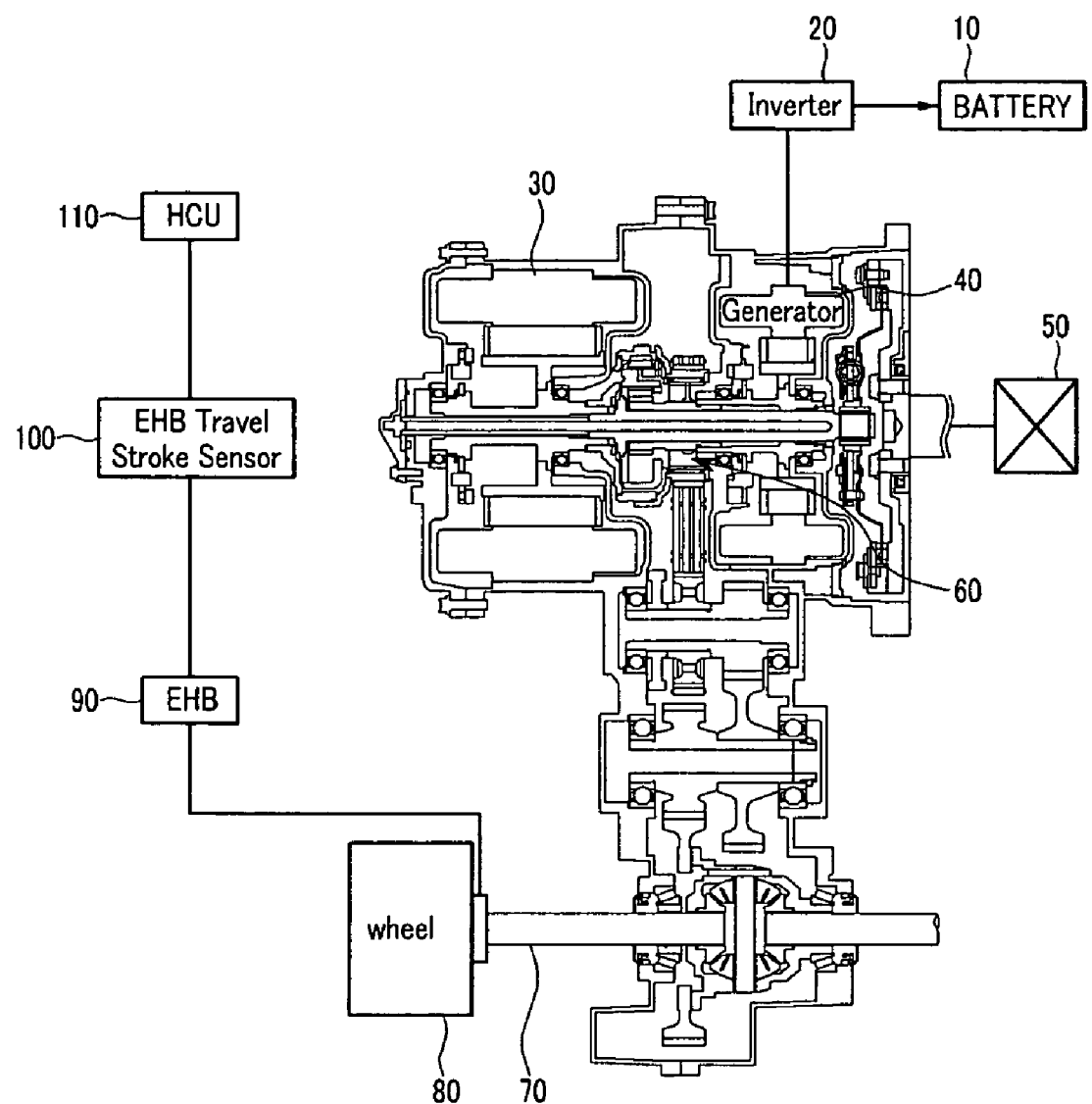
FIG. 2 is a schematic view of the hybrid vehicle according to an exemplary embodiment of the present invention.
Figure 3:
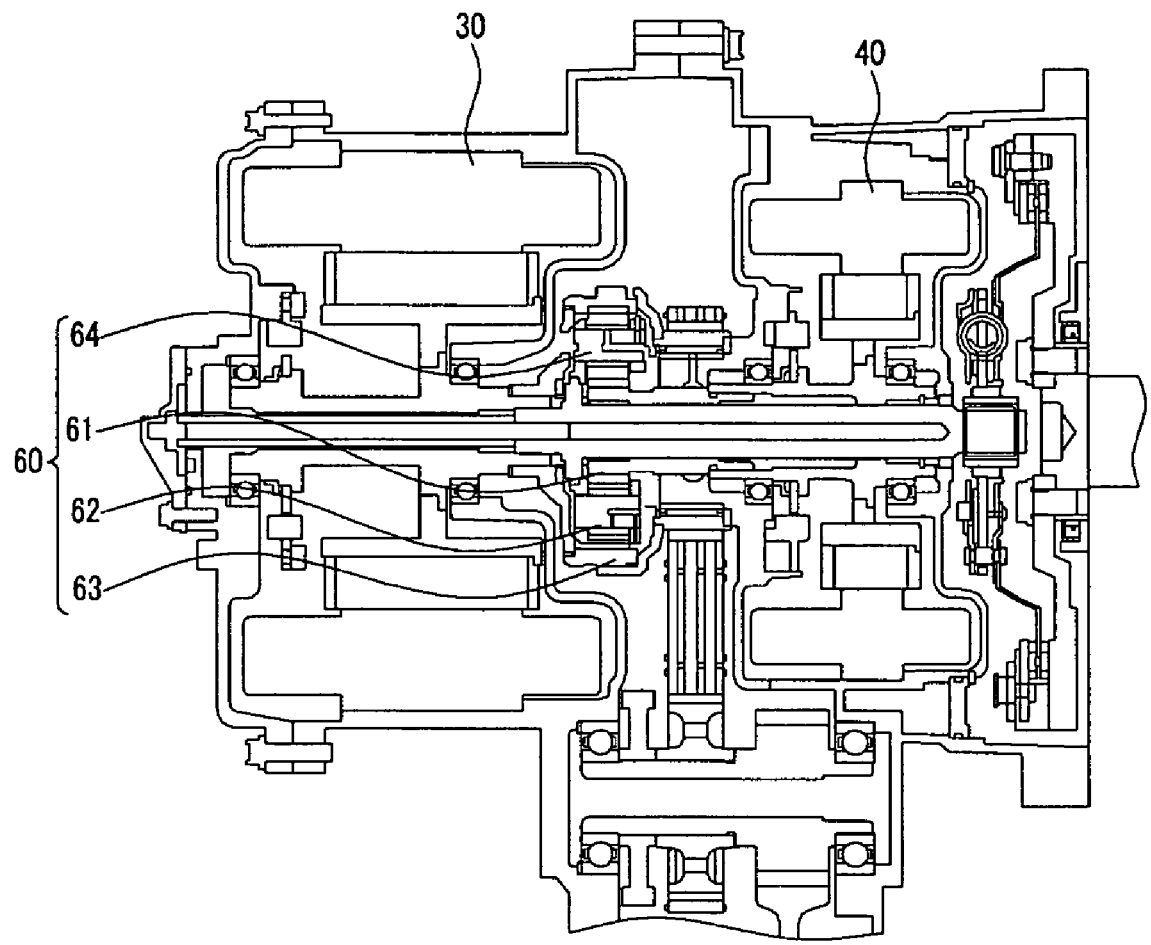
FIG. 3 is an enlarged view of an automatic transmission of FIG. 2.
Figure 4:
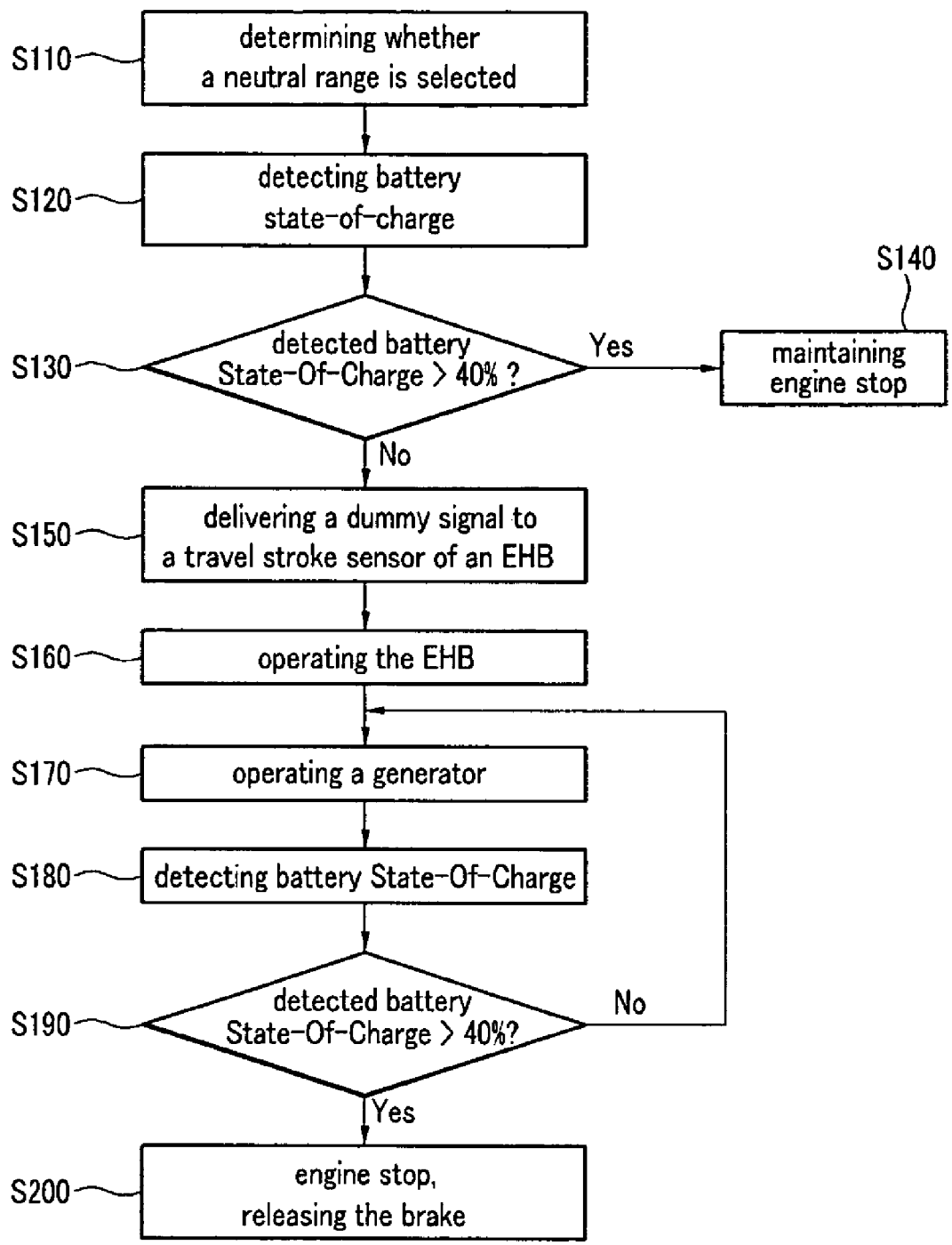
FIG. 4 is a flowchart illustrating a method for generating at a neutral shift range according to an exemplary embodiment of the present invention.

FIG. 2 shows a schematic structure of a hybrid vehicle according to an exemplary embodiment of the present invention, and FIG. 3 shows an enlarged view of an automatic transmission of FIG. 2.

A hybrid vehicle according to an exemplary embodiment of the present invention suitably includes a drive motor 30 and an engine 50 as a constituent element for generating a driving torque, and a generator 40 as a constituent element for generating electric power.

Such a hybrid vehicle suitably has a planetary gear set including a sun gear 61, a pinion gear 62, a ring gear 63, and a planet carrier 64 so as to change speed.

In a preferred configuration, the sun gear 61 is suitably connected to the generator 40, the planet carrier 64 is suitably connected to the engine 50, and the ring gear 63 is suitably connected to the drive motor 30.

Therefore, rotational energy of the sun gear 61 is suitably changed to the electric energy and stored in the battery 10 by being delivered through the generator 40 and an inverter 20.

In the planetary gear set 60, the ring gear 63 is suitably indirectly connected with the driveshaft 70 through some gears disposed between the ring gear 63 and the driveshaft 70, and acts as an output element.

The wheel 80 is suitably fixedly coupled to the driveshaft 70.

In such a hybrid vehicle according to an exemplary embodiment of the present invention, a HCU (hydraulic control unit) 110 and an EHB (Electro Hydraulic Brake) system 90 is suitably installed.

When a BMS (battery managing system) notice a shortage of the main battery at the neutral (N) shift range, and then outputs a signal of shortage of the main battery to the HCU 110, the HCU 110 suitably generates a dummy signal so as to operate the EHB (Electro Hydraulic Brake) 90.

Then, the HCU 110 suitably outputs the dummy signal to a travel stroke sensor.

When the dummy signal is suitably delivered to the travel stroke sensor of the EHB (Electro Hydraulic Brake) 90, the EHB suitably restricts a rotation of a wheel 80. When the wheel 80 is restricted, the rotation of the ring gear 60 connected with the wheel 80 is also restricted.

Generally, the hybrid vehicle suitably has an EHB 90 installed therein for efficient regenerative braking. The EHB 90 suitably is operated by a signal of the travel stroke sensor. The travel stroke sensor suitably detects an operation of the brake pedal by sensing the movement of the brake pedal, instead of measuring a force loaded on the brake pedal. Therefore, by using the travel stroke sensor, more precise control can be provided. A reference numeral 100 indicates the travel stroke sensor of the EHB detecting the dummy signal.

Hereinafter, referring to a flowchart of FIG. 3, a method for charging battery of a hybrid vehicle at a neutral (N) shift range according to an exemplary embodiment of the present invention will be described in more detail.

Firstly, it is detected whether the current shift range is a neutral (N) shift range at step S110.

In addition, battery SOC (state of charge) is measured at step S120.

Subsequently, the measured battery SOC is compared with a predetermined lower limit battery SOC at step S130.

Here, the lower limit battery SOC may be e.g. 40%.

As a result of comparing, if the measured battery SOC is higher than the lower limit battery SOC, engine stop is maintained at step S140.

On the other hand, if the measured battery SOC is lower than the lower limit battery SOC, the HCU suitably outputs a dummy signal to the travel stroke sensor of the EHB at step S150.

When the dummy signal is delivered, the EHB suitably operates at step S160.

When an EHB is operated, the generator is suitably operated so as to generate a electric energy and charge the battery at step S170.

Subsequently, battery SOC is measured again at step S180.

Then, the battery SOC measured at step S180 is compared with the predetermined lower limit battery SOC, and if the battery SOC measured at step S180 is lower than the lower limit battery SOC, generating and charging is suitably maintained at step S190.

However, the battery SOC measured at step S180 is higher than the lower limit battery SOC, the engine is suitably stopped and/or the brake is released at step S200.

According to an exemplary embodiment of the present invention, when battery charging is required, the generator is operated according to above-described method, and the battery is charged.

In addition, according to an exemplary embodiment of the present invention, battery charging at the neutral (N) shift range is enabled.

In addition, since the EHB system installed for regenerative braking is used for generating at neutral (N) shift range, without any additional equipment, manufacturing cost can be reduced, and the productivity can be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for charging battery of a hybrid vehicle at a neutral shift range, comprising:
   determining whether current shift range is neutral shift range;
   measuring a battery SOC(state of charge);
   operating an EHB (Electro Hydraulic Brake) when the measured battery SOC is lower than a predetermined lower limit battery SOC;
   operating a generator by operating an engine so as to charge the battery;
   measuring a battery SOC after operating the generator;
   stopping engine and releasing EHB when the battery SOC measured after operating the generator is higher than the predetermined lower limit battery SOC.

2. The method of claim 1, wherein
   operating an EHB (Electro Hydraulic Brake) when the measured battery SOC is lower than a predetermined lower limit battery SOC comprises:
   comparing the measured battery SOC with a predetermined lower limit battery SOC;
   outputting a dummy signal to a travel stroke sensor when the measured battery SOC is lower than the predetermined lower limit battery SOC; and
   operating the EHB on the basis of the dummy signal.

3. The method of claim 1, wherein
   the predetermined lower limit battery SOC is 40%.

4. The method of claim 1, wherein the operation of the EHB restricts a rotation of a wheel, wherein the wheel is fixedly connected with a ring gear of a planetary gear installed in an automatic transmission via a driveshaft.

5. A hybrid vehicle, comprising:
   an engine;
   a generator;
   a driveshaft for rotating a wheel;
   a planetary gear set having a sun gear, a ring gear, and a planet carrier, and connected with the engine, the generator and the driveshaft;
   wherein the sun gear is connected with the generator, the planet carrier is connected with the engine, and the ring gear is connected with the driveshaft;
   a HCU generating a dummy signal so as to operate an EHB(Electro Hydraulic Brake) when a battery shortage is detected;
   the EHB restricting a rotation of a wheel on the basis of the dummy signal, and a rotation of the driveshaft and ring gear coupled to the wheel is restricted when the EHB restricts a rotation of the wheel.

6. A method for charging battery of a hybrid vehicle at a neutral shift range, comprising:
   determining whether current shift range is neutral shift range;
   measuring a battery state of charge;
   operating an electro hydraulic brake when the measured battery state of charge is lower than a predetermined lower limit battery state of charge;
   operating a generator so as to charge a battery;
   measuring a battery state of charge after operating the generator;
   releasing the electro hydraulic brake when the battery state of charge measured after operating the generator is higher than the predetermined lower limit battery state of charge.

7. The method of claim 6 wherein an engine is reduced concurrently with releasing of the electro hydraulic brake.

* * * * *